United States Patent
Van Putten et al.

(10) Patent No.: US 9,874,761 B2
(45) Date of Patent: Jan. 23, 2018

(54) REFLECTIVE OR TRANSFLECTIVE AUTOSTEREOSCOPIC DISPLAY WITH REDUCED BANDING EFFECTS

(71) Applicant: KONINKLIJKE PHILIPS N.V., Eindhoven (NL)

(72) Inventors: Eibert Gerjan Van Putten, Eindhoven (NL); Olexandr Valentynovych Vdovin, Eindhoven (NL); Mark Thomas Johnson, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/442,772

(22) PCT Filed: Oct. 25, 2013

(86) PCT No.: PCT/IB2013/059659
§ 371 (c)(1),
(2) Date: May 14, 2015

(87) PCT Pub. No.: WO2014/076599
PCT Pub. Date: May 22, 2014

(65) Prior Publication Data
US 2015/0293365 A1 Oct. 15, 2015

Related U.S. Application Data

(60) Provisional application No. 61/727,277, filed on Nov. 16, 2012.

(51) Int. Cl.
*G02B 27/22* (2006.01)
*H04N 13/04* (2006.01)
*G02B 5/02* (2006.01)

(52) U.S. Cl.
CPC ..... *G02B 27/2214* (2013.01); *H04N 13/0404* (2013.01); *H04N 13/0409* (2013.01); *G02B 5/021* (2013.01); *G02B 5/0257* (2013.01)

(58) Field of Classification Search
CPC .... G02B 27/2214; G02B 27/22; G02B 27/26; G02B 5/02; G02B 5/021; G02B 5/0257;
(Continued)

(56) References Cited

U.S. PATENT DOCUMENTS

| | | | | |
|---|---|---|---|---|
| 7,712,908 B2* | 5/2010 | Hoshi | ...................... | G02B 5/045 |
| | | | | 359/485.06 |
| 8,047,673 B2* | 11/2011 | Santoro | ...................... | F21V 5/02 |
| | | | | 362/217.01 |

(Continued)

FOREIGN PATENT DOCUMENTS

WO 2007069099 A2 6/2007

OTHER PUBLICATIONS

Uehara, Shin-Ichi et al "1-Inch Diagonal Transflective 2D and 3D LCD with HDDP Arrangement" Proceedings of SPIE, vol. 6803, Feb. 2008, pp. 680300-680300-8.

(Continued)

*Primary Examiner* — Ricky Mack
*Assistant Examiner* — Kristina Deherrera (57) ABSTRACT

An autostereoscopic display uses a light diffusing arrangement which provides a greater degree of light diffusion for ambient light passing into the display than for the light modulated by the display pixels and exiting the display after reflection.

13 Claims, 7 Drawing Sheets

(58) Field of Classification Search
CPC ............... G02B 5/0284; G02B 5/0289; H04N 13/0404; H04N 13/0409
USPC ........................................................ 359/463
See application file for complete search history.

(56) References Cited

U.S. PATENT DOCUMENTS

| | | |
|---|---|---|
| 8,115,888 B2 | 2/2012 | Watanabe |
| 2004/0240777 A1 | 12/2004 | Woodgate |
| 2005/0024754 A1* | 2/2005 | Epstein .................. G02B 5/021 359/831 |
| 2007/0147066 A1* | 6/2007 | Boyd .................... G02B 5/3083 362/600 |
| 2008/0094700 A1 | 4/2008 | Uehara |
| 2011/0164036 A1 | 7/2011 | De Zwart |

OTHER PUBLICATIONS

Caulfield, H.J. "Optically Generated Kinoforms", Optics Communications, vol. 4, No. 3, Nov. 1971.
Zhou, Changyin et al "Depth from Diffusion", IEEE Conf. on Computer Vision and Pattern Recognition, 2010.

* cited by examiner

FIG. 1

[PRIOR ART]

REFLECTIVE OR TRANSFLECTIVE AUTOSTEREOSCOPIC DISPLAY WITH REDUCED BANDING EFFECTS

CROSS-REFERENCE TO PRIOR APPLICATIONS

This application is the U.S. National Phase application under 35 U.S.C. § 371 of International Application No. PCT/IB2013/059659, filed on Oct. 25, 2013, which claims the benefit of U.S. Provisional Patent Application No. 61/727,277, filed on Nov. 16, 2012. These applications are hereby incorporated by reference herein.

FIELD OF THE INVENTION

This invention relates to autostereoscopic displays, and concerns in particular the problem of banding, which relates to different views being displayed with different brightness. The invention is of particular relevance to reflective or transflective displays.

BACKGROUND OF THE INVENTION

Autostereoscopic 3D displays use a parallax barrier or lenticular lenses to generate multiple views. For a reflective or transflective display, where ambient light is used to illuminate the pixels of the display, such an optical element introduces an inhomogeneous pixel illumination. This effect is especially visible under (semi)-directional lighting conditions such as, but not limited to, sunlight or indoor spot lights. As a result of the inhomogeneous pixel illumination, certain views will be less bright or even completely absent.

Reflective displays have a paper-like appearance that is generally believed to look more natural than emissive displays. The main difference between emissive and reflective displays is the employed light source. In emissive displays either a combination of backlight with liquid crystal pixels or emissive pixels themselves are used to generate images. Reflective displays, on the other hand, selectively reflect ambient light in order to display their content. As a consequence, where the visibility of emissive displays generally decreases under ambient light, reflective displays excel under these natural lighting conditions. Furthermore, as reflective displays do not employ their own light source they consume only a low amount of power, giving them a strong advantage especially in mobile devices where they facilitate extraordinary long battery lives, for example of up to several weeks.

A combination of both types of displays is a transflective display, which can either operate in reflective mode without using backlight, or can adjust to the dark conditions switching to the transmissive mode of pixel operation with a backlight. In this case the display is composed of pixels of transmissive and reflective types.

Depending on the type of the reflective display (electrophoretic, electrowetting, stacked electrowetting etc.) the pixels can reflect the incoming light either dominantly by themselves, can be switched between reflective and transmissive modes, or change their transmittance. In the last two cases the light after propagation through the pixels gets reflected from a back reflector inside the display. This reflector can be a specular reflecting mirror, surface structured mirror or diffuse reflecting component.

In a 3D display, by placing a parallax barrier or lenticular lens on top of a 2D display, an autostereoscopic 3D display can be created that generates a plurality of views in space. The user is provided with the illusion of depth in the image by observing different views with the left and the right eye. By creating more than two views, the system can even accommodate, for a limited motion, parallax thereby enhancing the depth perception.

Existing 3D displays mainly employ emissive displays. The use of parallax barrier or lenticular lenses for reflective displays is highly non-trivial and intrinsically distinct from emissive displays due to the difference in illumination. This difference arises from the fact that the ambient light has to travel twice through the same optical element; both when illuminating the pixels and when the light is reflected from the pixels towards the user.

Figure 1:
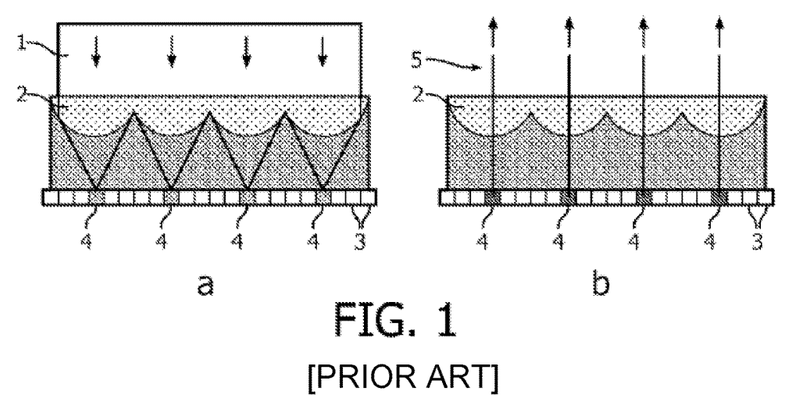
FIG. 1 shows the origin of the problem of inhomogeneous illumination of pixels in autostereoscopic display with reflective or transflective pixels for the light passing through the lens structure.

FIG. 1 shows this problem graphically. The display is a reflective display covered with a lenticular foil 2. FIG. 1(a) shows the display under directional ambient illumination 1. The ambient light is focussed onto the reflective layer, thereby illuminating only a small subset 4 of the available pixels 3. FIG. 1(b) shows that the subset of illuminated pixels can generate only a limited amount of views 5 (FIG. 1(b) ignores the views from the same pixels in other viewing cones).

This arises because the illumination light is inhomogeneously distributed over the display in the direction of the lenticular lens pitch. As a result, certain pixels, responsible for the corresponding views, will be less illuminated or not illuminated at all. The corresponding views will therefore be less bright and will be perceived by a user as dark bands. This effect will be especially pronounced under (semi)-directional ambient illumination conditions, such as direct sun light or indoor overhead lights.

To estimate the influence of directionality of illumination, typical device parameters for autostereoscopic 3D displays can be considered. The typical ratio of lens pitch to the distance between the pixel plane and the lens apex of about $\frac{1}{6}$ to $\frac{1}{8}$ results in an angular width of one viewing cone of 7 degrees to 9.5 degrees. For office illumination with overhead lights (lamp size 10 cm to 20 cm at 3 m height ceiling, such as downlights or TL-tubes) the typical angular spread of illumination rays at the device would be 2 degrees to 4 degrees, which means that only a small proportion of the views ($\frac{1}{5}$ to $\frac{1}{2}$) will be visible to the viewer.

For typical hand-held devices the problem may become even more pronounced, as typically light with divergence of 7 degrees would illuminate about one pixel. Therefore extra measures and solutions are required to spread semi-directional illumination light over multiple pixels.

SUMMARY OF THE INVENTION

The invention provides a display and method as defined in the independent claims.

According to the invention, there is provided a reflective or transflective autostereoscopic display comprising:
a display panel having an array of pixels;
a view forming arrangement for providing images from different pixel groups in different directions; and
an asymmetric light diffusing arrangement in the optical path of light incident to the display and light reflected from the display after modulation by the display pixels, wherein the light diffusing arrangement provides a greater degree of light diffusion for the incident light than for the reflected light.

By asymmetric is meant that the diffusion properties are different for opposite directions of light passing through the light diffusing arrangement.

This arrangement reduces the inhomogeneous pixel illumination by employing a diffuser to spread out the incident ambient light. To prevent that the diffuser thereby also mixes the different outgoing views, an asymmetric diffuser is used which has a different scattering profile depending on the propagation direction of the light.

In one implementation the display comprises, in order from the output face, a lenticular lens array comprising lens bodies of a first refractive index $n_1$ greater than the air refractive index, the diffuser comprising a layer with a rough surface and an overlying replica, with the replica having a smaller refractive index n2 than the refractive index n3 of the diffuser layer on the display panel side. The lens bodies in this example have curved surfaces which face outwardly.

In another implementation, the display comprises, in order from the output face, a lenticular lens array comprising lens bodies of a first refractive index $n_1$ and a replica layer with second refractive index $n_2$, and the diffuser comprises a layer with a third refractive index $n_3$, wherein a rough interface is between the replica layer and the diffuser layer and $n_2$ is less than both $n_1$ and $n_3$. The lens bodies in this example have curved surfaces which face inwardly.

In another implementation, the display comprises, in order from the output face, the diffuser having a rough outer surface and having a first refractive index $n_1$, a replica layer having a second refractive index $n_2$ and a lenticular lens array comprising lens bodies of a third refractive index $n_3$, wherein $n_2$ is less than both $n_1$ and $n_3$. The lens bodies in this example have curved surfaces which face outwardly.

In another implementation, the display comprises, in order from the output face, the lenticular array having a rough outer surface to define the diffuser and an inner surface which defines the lens bodies, the lenticular array having a first refractive index $n_1$, and a replica with a second refractive index $n_2$, wherein $n_1$ is greater than $n_2$ and the air refractive index.

In this example, the outer surface of the lenticular is roughened, such that the lensing and light scattering properties are combined in one element. The rough surface of the lens faces outwardly and the lens shapes face inwardly. The lens bodies in this example thus have curved surfaces which face inwardly.

In another implementation, the light diffusing arrangement is provided between the array of pixels and a back reflector behind the pixel array. This provides a design which is integrated into the display panel structure rather than provided as layers over the display panel. The lens bodies can then curve inwardly or outwardly—indeed any lens arrangement can be used as the light scattering is integrated into the display panel.

The light diffusing arrangement can comprise a kinoform diffuser or, for example, a one dimensional prismatic structure and a diffuser, or can comprise different optical microstructures which will have similar effect on light scattering properties The display can comprise a reflective autostereoscopic display or a transflective autostereoscopic display having reflective display pixels and transmitting display pixels, or a combination of the two types.

The invention also provides a method of improving the uniformity of illumination of a display panel of an autostereoscopic display which comprises a display panel having an array of pixels and a view forming arrangement for providing images from different pixel groups in different directions, wherein the method comprises scattering the light entering the display from the ambient surroundings and reflected light leaving the display after modulation by the display pixels using an asymmetric light diffusing arrangement which provides a greater degree of light diffusion for the light entering the display than for the reflected light leaving the display.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an autostereoscopic display which uses a light diffusing arrangement which provides a greater degree of light diffusion for light passing into the display than for light exiting the display.

The invention creates a more homogeneous pixel illumination from light incident to the display thereby eliminating the effect of missing views and dark bands, while at the same time avoiding extra crosstalk between different views that are generated by the reflective or transflective display.

By introducing an element that scatters light between the lenticular/parallax barrier and the display, above the lenticular/parallax barrier, or inside the display, the incident light is scattered over a larger area increasing the homogeneity of the illumination at the pixels.

Figure 2:
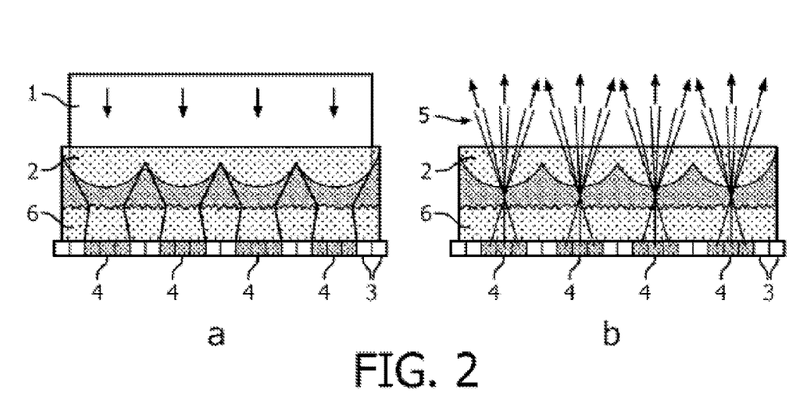
FIG. 2 shows how the invention reduces the problem.

FIG. 2 shows the effect of the invention using the same reference as in FIG. 1.

In the example of FIG. 2, a diffuser 6 is introduced in between the lenticular 2 and the pixel plane, and this means that the incident light is scattered over a larger area increasing the homogeneity of the illumination at the pixels. As more pixels are illuminated, more views 5 are generated as shown in FIG. 2(b).

To ensure that the light reflected from the pixels ends up in the proper view, the element 6 should scatter less for light leaving the display.

Holographic diffusers can provide such behaviour where they result in a broad diffusion profile for one propagation direction and a narrower diffusion profile for the other propagation direction. Alternatively a similar optical function can be realised by combinations of known components, such as a combination of one dimensional prismatic structures and a standard weak volume or surface diffuser. Instead of prismatic structures, trapezoidal structures, pyramids, truncated pyramids of other microstructures can be used to provide similar optical functions.

Examples of possible diffusers are discussed below.

Optical diffusers are widely used in a large number of optical applications, such as commercial photography, lighting devices and display projectors, to shape or soften illumination by scattering light in random directions. Traditional diffusers employ multiple scattering to scramble the light field resulting often in a relatively low transmission. Kinoform diffusers, which are phase-only surface-relief holograms of a conventional diffuser, allow for much higher transmission and enable for a highly engineered scattering profile.

Figure 3:
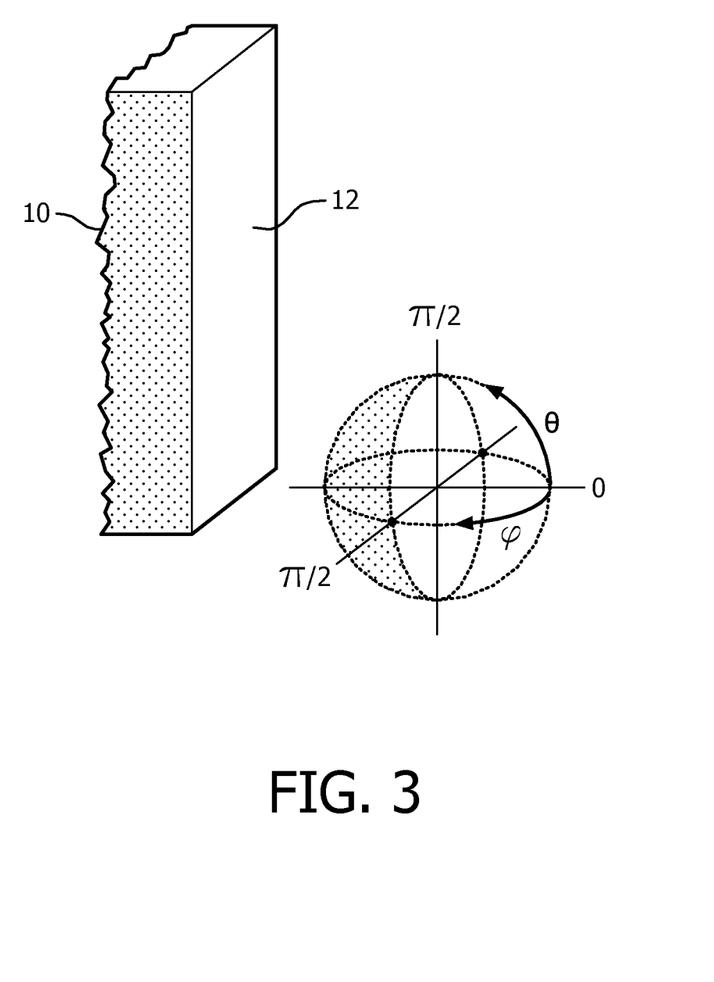
FIG. 3 shows a schematic of a first known example of asymmetric diffuser.

FIG. 3 is a schematic of a kinoform diffuser with a rough side 10 and a smooth side 12. The inset shows the coordinate system. In this orientation, light arriving under an angle ($\pi/2 \leq \theta_i$, $\varphi_i < 3\pi/2$) impinges on the smooth side (dark gray spherical surface of the insert). Light arriving under a different angle ($-\pi/2 \leq \theta_i$, $\varphi_i < \pi/2$) first hits the rough side of the diffuser (light gray spherical surface of the insert).

A mathematical framework to describe the working of the diffusers will now be presented. The goal is merely to define a set of four parameters that describe (to first order) the scattering profile of the diffuser. Two of the parameters, $\sigma_\theta^S$ and $\sigma_\varphi^S$, define the angular widths of the scattering profile for light entering on the smooth side of the diffuser. The other two parameters, $\sigma_\theta^R$ and $\sigma_\varphi^R$, define the angular widths for light entering from the rough side. The reader can choose to skip the mathematical details and go directly to the end result.

Most generally, the scattering properties of a diffuser are defined by a scattering function $\mathcal{D}(\theta_i, \varphi_i, \theta_o, \varphi_o)$ that depends on the incident angle ($\theta_i$, $\varphi_i$) and the outgoing angle ($\theta_o$, $\varphi_o$). Most diffusers are engineered to depend only on the relative difference between the outgoing and ingoing angle. That allows us to simplify the scattering function to $$\mathcal{D}(\Delta\theta, \Delta\varphi),$$

where $\Delta\theta \equiv \theta_o - \theta_i$ and $\Delta\varphi \equiv \varphi_o - \varphi_i$.

The scattering surface of a kinoform diffuser is always at the interface of two different materials with different refractive indices. Subsequently, the scattering profile also depends on which side of the diffuser the light enters. Light entering from the smooth side of the diffuser ($\eta/2 \leq \theta_i$, $\varphi_i < 3\eta/2$) encounters a scattering function $\mathcal{D}_S$ while light entering from the rough side ($-\eta/2 \leq \theta_i$, $\varphi_i < \eta/2$) is scattered according to the function $\mathcal{D}_R$:

$$\mathcal{D}(\Delta\theta, \Delta\phi) = \begin{cases} \mathcal{D}_R(\Delta\theta, \Delta\phi), & \text{for } -\pi/2 \leq \theta_i, \phi_i < \pi/2 \\ \mathcal{D}_S(\Delta\theta, \Delta\phi), & \text{for } \pi/2 \leq \theta_i, \phi_i < 3\pi/2. \end{cases}$$

For most scattering profiles, such as a Gaussian or a 2D rectangle profile, it is straightforward to define typical width values that indicate the angular extent of the scattering. In the rest of the text we use this fact to simplify the discussion by using just four width parameters $\sigma_\theta^R$, $\sigma_\varphi^R$, $\sigma_\theta^S$, and $\sigma_\varphi^S$ to describe the complete scattering profile. For example, a 2D rectangle function would be described by $$\mathcal{D}_R(\Delta\theta, \Delta\phi) = \alpha^R \sqcap\left(\frac{\Delta\theta}{2\sigma_\theta^R}, \frac{\Delta\phi}{2\sigma_\phi^R}\right)$$

$$\mathcal{D}_S(\Delta\theta, \Delta\phi) = \alpha^S \sqcap\left(\frac{\Delta\theta}{2\sigma_\theta^S}, \frac{\Delta\phi}{2\sigma_\phi^S}\right)$$

where the parameters $\alpha^R$ and $\alpha^S$ normalize the functions and where the rectangle function is defined as $$\sqcap(x, y) = \begin{cases} 0 & \text{if } |x| > \frac{1}{2} \text{ or } |y| > \frac{1}{2} \\ \frac{1}{2} & \text{if } |x| = \frac{1}{2} \text{ and } |y| = \frac{1}{2} \\ 1 & \text{if } |x| < \frac{1}{2} \text{ or } |y| < \frac{1}{2}. \end{cases}$$

Figure 4:
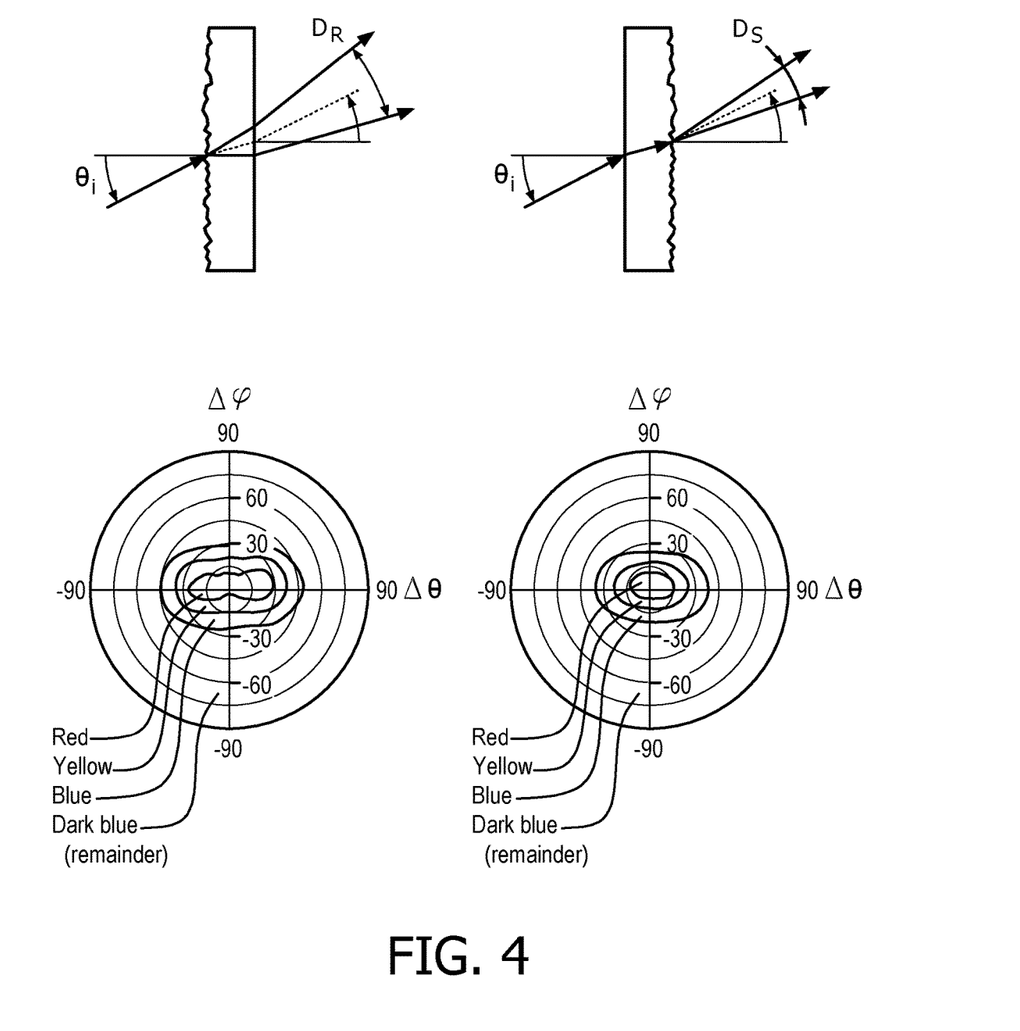
FIG. 4 shows the angular intensity distribution patterns for the light transmitted through the diffuser of FIG. 3 for opposite directions of light passing through the diffuser.

FIG. 4 shows a diffuser with distinct bidirectional scattering profile. Schematics are shown at the top of FIG. 4 and measurements are shown at the bottom of light propagating through a kinoform diffuser entering from the rough side (left images) and for light entering from the smooth side (right images) at normal incidence to its surface.

The two dimensional "color" plots represent the measured intensity distribution in the form of contour plot diagrams. The "colors" in the order RED-YELLOW-BLUE-DARK BLUE" correspond to the measured intensity levels in decreasing order. (Thus RED is the highest intensity and DARK BLUE is the lowest intensity.)

The diffuser is a holographic kinoform diffuser from Ledalight (trade mark) and the two clearly distinct scattering functions $\mathcal{D}_S$ (left) and $\mathcal{D}_R$ (right) can be seen in the bottom images for transmitted light. Illuminating the diffuser from the rough side results in a broad scattering profile with a full width at half max (FWHM) of approximately 60 degrees. When the diffuser is rotated so that the light first illuminates the smooth side of the diffuser, a much narrower scattering distribution results with a FWHM of approximately 30 degrees.

The introduction of a diffuser in an optical system causes the light field to be broadened. At an optical distance h from the diffuser the original field $E_{orig}$ becomes, under the paraxial approximation:

$$E(x,y,z=h) = E_{orig}(x,y,z=h) \otimes \tan(\mathcal{D})h,$$

where $\otimes$ represents the convolution product. As a result, a perfectly sharp image would now look blurred. The larger the distance h and the wider the angular scattering profile $\mathcal{D}$, the more blurred the image becomes.

The non-uniformity of the diffusion characteristics arises from the dependency on the order in which the scattering and bending functions take place at the rough and smooth surfaces (respectively) of the diffuser, as well as the different total internal reflections which arise.

There are alternative optical elements with distinct bidirectional scattering profiles.

Figure 5:
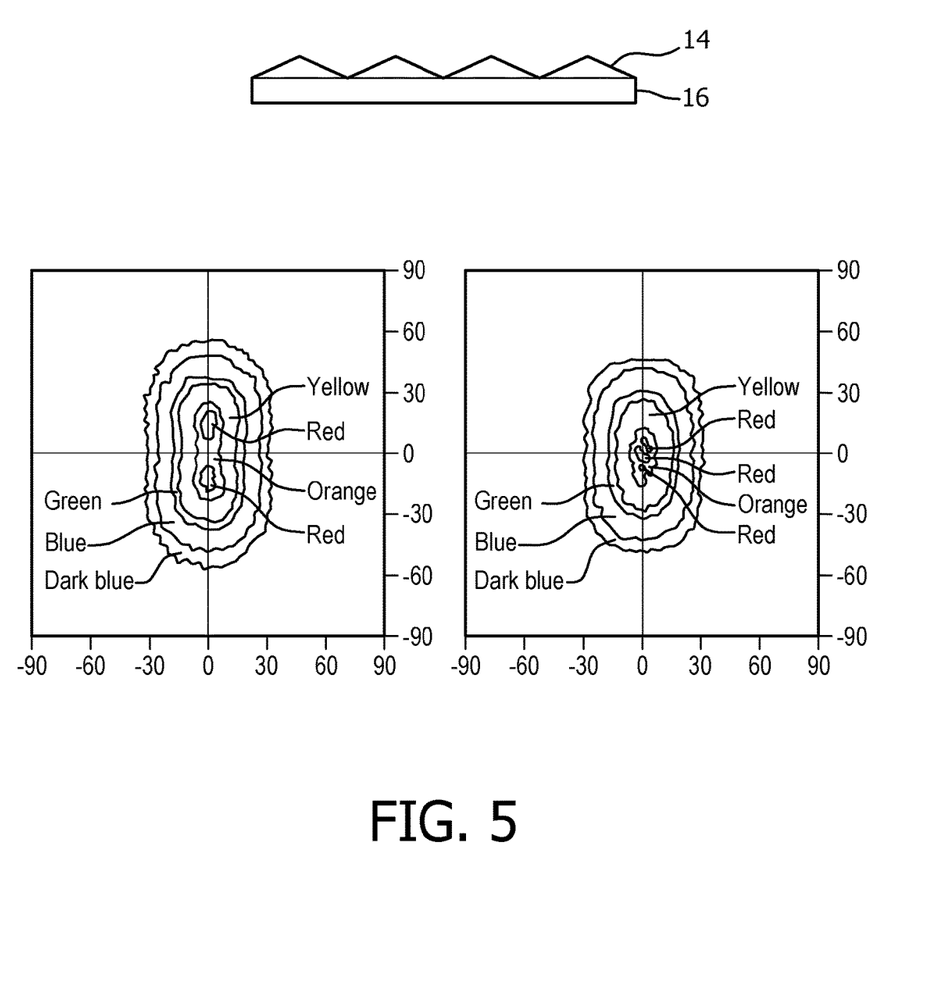
FIG. 5 shows a second example of asymmetric diffuser and its properties for opposite directions of light travel through the diffuser.

For example, a similar optical function can be realised by a combination of one dimensional prismatic structures and a standard weak volume or surface diffuser. An example of optical simulations with ray traces software is shown in FIG. 5 for a structure of a 1D elongated prism foil 14 over a weak volume or surface diffuser 16. Light incident first on the prismatic structure produce a "split-beam"-like elongated profile in one direction, while upon illumination of the structure from the side of standard diffuser a narrower scattering distribution in the beam is obtained. This example shows that an optical element to realise different scattering profile depending on light propagation direction can be realised with a combination of standard optical components.

The simulations show the angular transmission distributions of collimated light impinging from different sides onto the structure. The two dimensional "color" plots represent the measured intensity distribution in the form of contour plot diagrams. The "colors" in the order RED-ORANGE-YELLOW-GREEN-BLUE-DARK BLUE" correspond to the measured intensity levels in decreasing order. (Thus RED is the highest intensity and DARK BLUE is the lowest intensity.) The scattering angles for outgoing light is clearly different in two cases.

Figure 6:
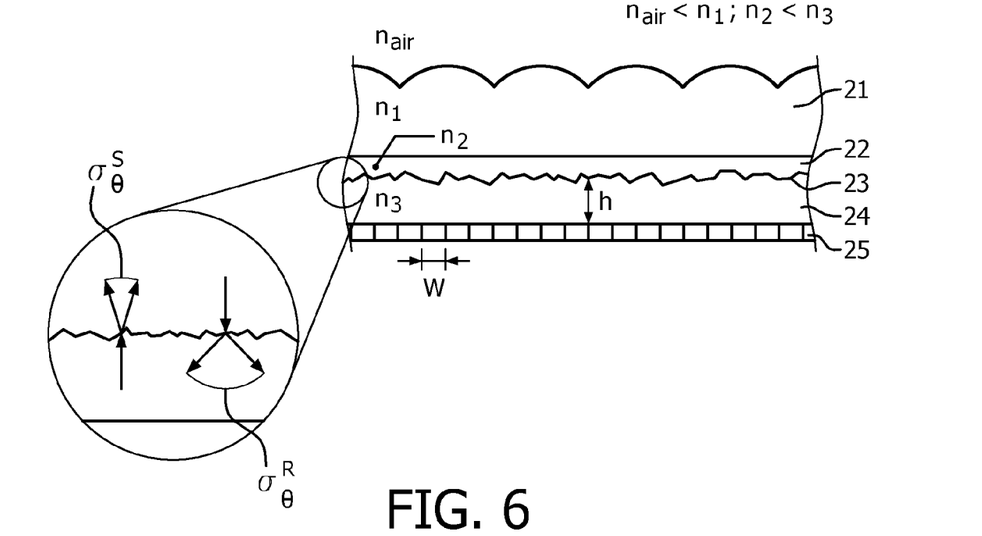
FIG. 6 shows a first example of display of the invention.

A first example of the display of the invention is shown in FIG. 6. The device comprises a lenticular sheet 21 over a diffuser structure 22, 24. The diffuser has a defusing layer 24 with a scattering top surface 23. A replica 22 is provided over the scattering surface. The replica can be a solid or a gas, and needs to have a different refractive index to the diffuser layer 24. The display employs reflective pixels 25.

The lenticular sheet forms outward facing lenses, namely the central part of the lenslet surface is further from the display panel than the lenslet boundaries, so that the lens surface curves outwardly viewed from the pixel plane.

The lenticular sheet 21 has a refractive index $n_1$. The optical diffuser layer 24 has refractive index $n_3$. The replica layer 22, between the lenticular sheet 21 and the scattering surface 23 of the diffuser layer 24 which has a refractive index $n_2 < n_3$. This layer can, for example, be made by inserting glue in between 21 and 23 or by filling this cavity with air. Below the diffuser layer 24 is the display panel 25 with pixels.

The pitch and radius of the lenticular sheet should be designed as for a normal display (as if there was no scattering layer) but taking into account the optical path length due to the refractive index $n_2$ and $n_3$ in the diffuser replica layer 22 and in the main diffuser layer 24 respectively.

Light that is incident onto the device will propagate first through the rough side of the diffuser 24 and therefore experiences the scattering profile $\mathcal{D}_R$. On the other hand, light reflecting from the display 25 scatters according to the scattering profile $\mathcal{D}_S$. The scattering properties $\sigma_\theta^R$, $\sigma_\varphi^R$, $\sigma_\theta^S$, $\sigma_\varphi^S$ and the position of the scattering layer should in the optimal case yield:

$$\tan(\sigma\theta^S)h/n_3 = w/2 < \tan(\sigma_\theta^R)h/n_3,$$

$$\tan(\sigma_\varphi^S)h/n_3 \leq w/2,$$

where w is the pixel size, $n_2$ the refractive index of the diffuser 24 and h the thickness of the diffuser 24. The angular direction θ is defined in the vertical plane parallel to the lenticular lens pitch direction and the angular direction φ in the vertical plane perpendicular to it. Under these conditions, illumination light is mainly spread out over the display in the direction of the lenticular lenses pitch (which was the direction in which the lenticular lenses were causing an inhomogeneous illumination). The light reflected from the display is only moderately affected by the scattering layer. The kinoform diffuser from Ledalight (trade mark) that is shown above is an example of such a diffuser that could comply with these conditions.

For the best performance of the invention, the ratio $\sigma_\theta^R/\sigma_\theta^S$ should be maximized.

Figure 7:
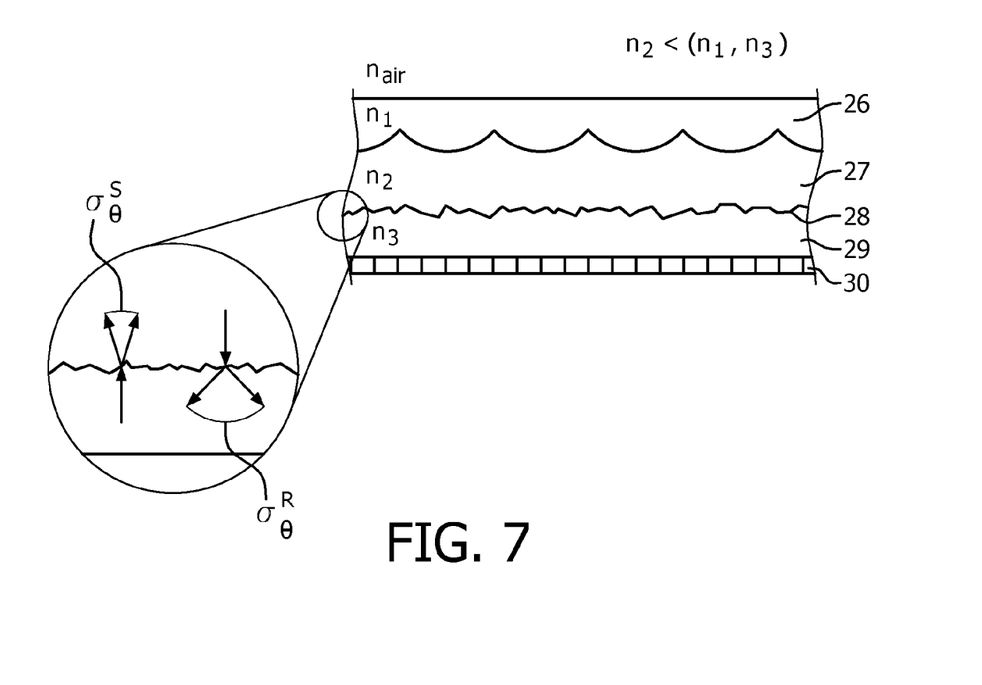
FIG. 7 shows a second example of display of the invention.
Figure 8:
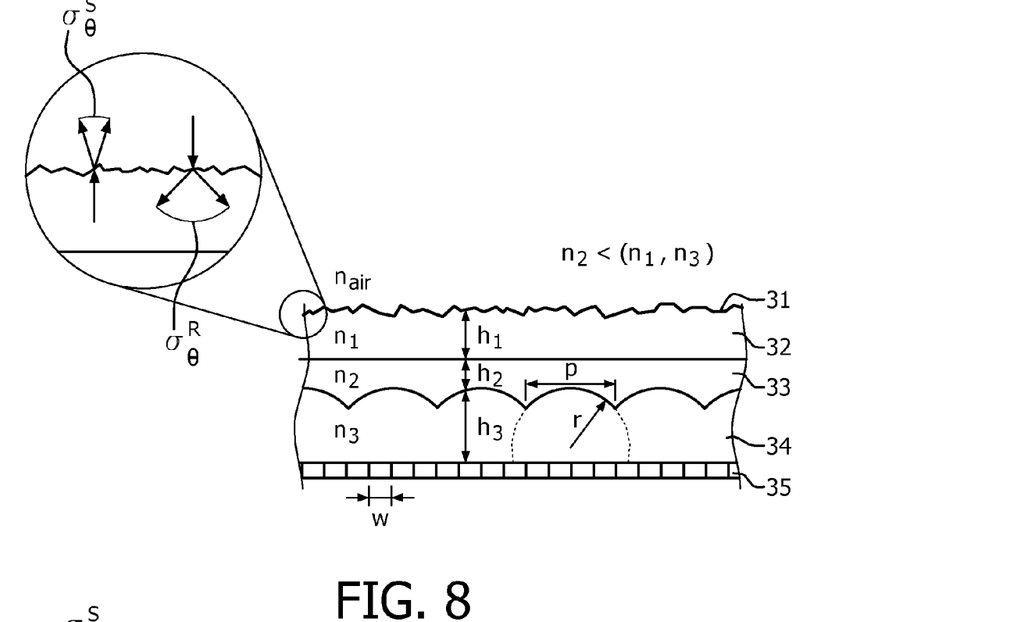
FIG. 8 shows a third example of display of the invention.
Figure 9:
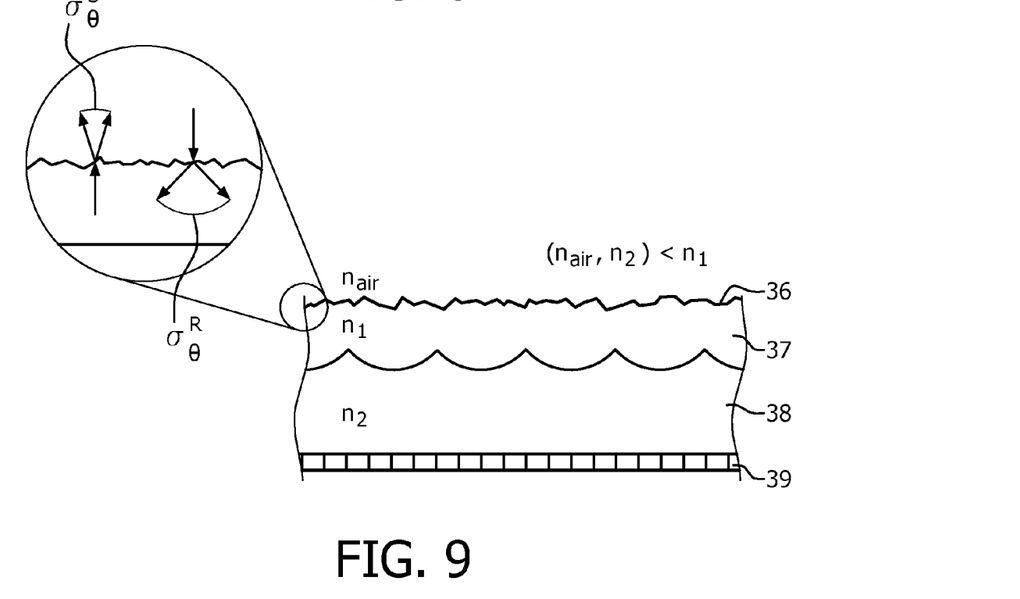
FIG. 9 shows a fourth example of display of the invention.

FIG. 7 to FIG. 9 show different embodiments, which differ in the stacking order and orientation of the components. For a proper functioning of the device, the different layer materials are selected appropriately. For example, the constraints for the refractive index of the layers are related to the stacking order.

FIG. 7 shows a first variation in which the lenticular 26 is placed upside down with respect to the embodiment of FIG. 6, i.e. facing inwardly. This embodiment helps in reducing losses due to Fresnel reflection on the interface of the lens and makes the optical layer less visible to the viewer. Below the lenticular sheet is a lens replica 27, which acts also as a spacer. The refractive index of the lens replica 27 $n_2$ is smaller than the refractive index $n_1$ of the lenticular 26. Layer 27 also acts as a replica to the scattering surface 28 of the diffuser layer 29 that is placed below the lens replica layer 27. Below the diffuser 29 comes the display panel 30 with pixels.

In the example of FIG. 8, the diffuser layer 32 with refractive index $n_1$ is on top with its diffusing surface 31 facing outwardly. Below the diffuser 32 a layer 33 with refractive index $n_2 < n_1$ is provided, which acts as a spacer and as a replica to the lenticular 34. The lenticular 34 should have a refractive index $n_3 > n_2$. Below the lenticular 34 comes the display 35.

As the diffuser is now on top of the lenticular, different constraints exist on the scattering properties $\sigma_\theta^R$, $\sigma_\varphi^R$, $\sigma_\theta^S$, and $\sigma_\varphi^S$. The first set of constraints is:

$$\tan(\sigma_\theta^S)(h_1/n_1 + h_2/n_2) < p/2$$

$$\tan(\sigma_\varphi^S)(h_1/n_1 + h_2/n_2 + h_3/n_3) < w/2,$$

where p is the lenticular lens pitch. These two conditions ensure that the pixels inside one view show no cross talk.

There is also the requirement that different views show no cross talk but that at the same time the illumination light spreads over multiple views (or, in other words, spread over multiple pixels). This constraint is achieved by ensuring that $\sigma_\theta^S < \Theta/2 < \sigma_\theta^R$, where Θ is the angular width of a view created from pixels with width w as seen through the lenticular sheet. The actual value of Θ depends on the width of the original pixels w, the pitch p and the radius r of the lenticular lenses, the thickness of the lenticular sheet $h_3$, the refractive index ratios $n_2/n_3$ and $n_1/n_2$.

Similar to the embodiment of FIG. 6, the ratio $\sigma_\theta^R/\sigma_\theta^S$ should be maximized for best performance.

A third alternative stacking possibility shown in FIG. 9 consists of a lenticular 37 which has one surface 36 roughened to act as a diffuser. Below the lenticular 37 is a lens replica 38 which function as a spacer. The refractive index $n_1$ of the lenticular 37 should be larger than the refractive index $n_2$ of the replica 38. Below the replica 38 is the display 39.

Figure 10:
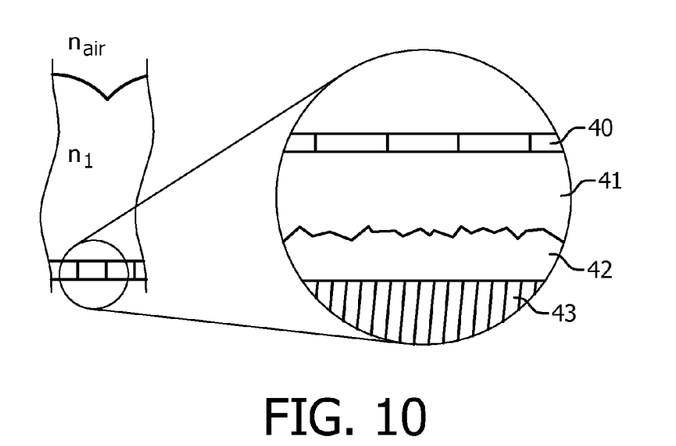
FIG. 10 shows a fifth example of display of the invention.

There are further possible alternatives. Instead of placing extra components on top of the display, the elements could also be incorporated inside the display itself. FIG. 10 shows an alternative embodiment. A diffuser 42 is placed between the pixel plane 40 and the reflecting plane 43. Layer 41 acts as a spacer and a replica to the diffuser.

The pixel plane 40 can be a single layer or could be a stacked multi-layer pixel plane.

In this alternative embodiment light has to propagate twice through the pixel plane 40; once before it is scattered as ambient illumination light which passes through the pixel towards the back reflector; and a second time after it has been scattered and has been reflected from the reflecting layer 43. The incoming light and outgoing light can propagate through different pixels thereby introducing cross-talk. Nevertheless, this embodiment still helps to improve the homogeneity of the pixel illumination. This embodiment also allows use of a simpler (and possibly cheaper) specular reflecting back-mirror 43.

Figure 11:
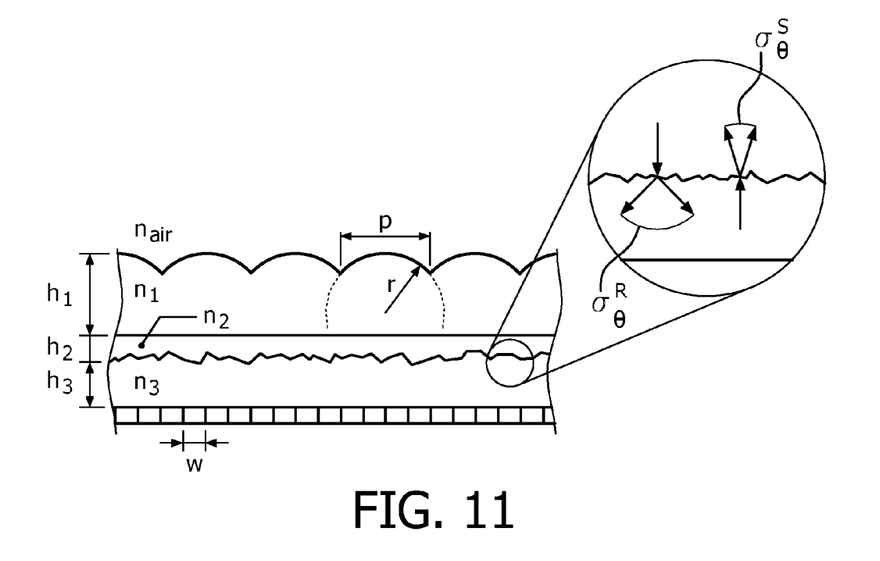
FIG. 11 shows the description of design parameters for the display of FIG. 6.

FIG. 11 shows the version of FIG. 6 with additional details to show relevant parameters. Examples of the different required parameters for a typical reflective display will now be derived, in this case the popular and widely available Amazon Kindle (trade marks).

This black and white reflective display is based on E-ink technology with a resolution of 167 pixels/inch (equivalent to 167 pixels/2.54 cm). Good 3D performance can be realised with 5 views. For a typical viewing distance for hand-held device of 0.5 m this will result in the angular width of one viewing cone of 18 degrees, which would correspond to the usage of lenticulars lens having focal length of 2.375 mm in air.

The important parameters are summarized in the table below, corresponding to those shown in FIG. 11. It is shown that for the typical reflective display with a combination of lenticular lens and diffuser it is possible to reduce the effect of non-uniform pixel illumination and the banding caused by this by at least a factor of two. The position of the scattering layer and its scattering properties satisfy the relations described above.

| Description | Symbol | Value | Unit |
| --- | --- | --- | --- |
| Pixels per inch (pixels per 2.54 cm) | | 167 | px/inch |
| Width pixel | w | 152 | μm |
| Refractive index | n1 | 1.49 (PMMA) | — |
| Refractive index | n2 | 1 (air) | — |
| Refractive index | n3 | 1.49 (PMMA) | — |
| Lenticular lens pitch | P | 0.76 | mm |
| Height | h1 | 3215 | μm |
| Height | h2 | 10 | μm |
| Height | 3 | 309 | μm |
| Angular width scattering profile | $\sigma_\theta^S$ | 15 | degree |
| Angular width scattering profile | $\sigma_\theta^R$ | 30 | degree |
| Angular width scattering profile | $\sigma_\varphi^S$ | 15 | degree |
| Angular width scattering profile | $\sigma_\varphi^R$ | 15 | degree |
| Focal length of lenticulars (in air) | $h_1/n_1 + h_2/n_2 + h_3/n_3$ | 2.375 | mm |
| Total thickness | $h_1 + h_2 + h_3$ | 3.534 | mm |
| Number of views | N | 5 | — |
| Reduction factor in banding | $\sigma_\theta^R/\sigma_\theta^S$ | 2 | — |

The invention is of interest for reflective and transflective autostereoscopic 3D displays.

The invention applies generally to display devices in which display pixel modulate the incident light (rather than generate the light). The most common display technology of this type uses liquid crystal pixels, and reflective displays can be formed using liquid crystal displays. However, other display technologies can be used. The pixels can be reflective themselves (such as E Ink pixels) or they can be transmissive (such as LCD pixels) with the use of an additional reflector. The pixels can be use electrophoretic technology (either in plane or transverse), electrowetting technology, electrofluidic systems, or they can be MEMS-based systems. The invention can be applied to any known display technology.

The examples above show the use of lenticular lenses. The lenses are typically in the pixel column direction or slightly offset from the pixel column direction (so that a loss of resolution is shared between the row and column directions). Microlenses can instead be used, which each cover a small sub-array of pixels. In the case of microlens arrangements, the diffusing arrangement should preferably diffuse both the incoming light and the outgoing light in a less elliptical manner than the examples shown in FIGS. 4 and 5, reflecting the fact that the micro lens may have image forming properties in more than one direction. Again however, the diffusion of incoming light should exceed that of the reflected light. Furthermore, the invention can be applied to autostereoscopic displays which use other types of view forming arrangement, such as barriers.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A reflective or transflective autostereoscopic display comprising:
    a display panel having an array of pixels;
    a replica layer;
    a view forming arrangement that provides images from different pixel groups of the array of pixels in different directions,
        wherein the view forming arrangement comprises a lenticular lens array,
        wherein the lenticular lens array comprising lens bodies of a first refractive index $n_1$ greater than a refractive index of air; and
    an asymmetric light diffusing arrangement disposed in the optical path of light incident to the display and light reflected from the display after modulation by the display pixels,
    wherein the asymmetric light diffusing arrangement provides a greater degree of light diffusion for the incident light than for the reflected light
    wherein the asymmetric light diffusing arrangement is in direct contact with the display panel,
    wherein the asymmetric light diffusing arrangement includes a diffuser comprising a layer with a rough surface,
    wherein the rough surface faces the replica layer,
    wherein the replica layer is situated between the lenticular lens array and the display panel, wherein the asymmetric light diffusing arrangement is situated between the replica layer and the display panel,
wherein the replica layer has a smaller refractive index $n_2$ than a refractive index $n_3$ of the diffuser layer.

2. The display of claim 1, wherein the replica layer comprises a solid or air.

3. The display of claim 1, wherein the lens bodies comprise curved surfaces which face away from the display panel.

4. The display of claim 1, wherein the refractive index $n_2$ of the replica layer is less than both $n_1$ and $n_3$.

5. The display of claim 4, wherein the lens bodies comprise curved surfaces which face toward the display panel.

6. The display of claim 1, wherein the lens bodies comprise curved surfaces that face away from the display panel.

7. The display of claim 1, wherein the lens bodies comprise curved surfaces that face the display panel.

8. The display of claim 1, wherein:
the display comprises a back reflector on an opposite side of the display panel than the view forming arrangement, and
the light diffusing arrangement is situated between the array of pixels and the back reflector.

9. The display of claim 1, wherein the light diffusing arrangement comprises a kinoform diffuser.

10. The display of claim 1, wherein the light diffusing arrangement comprises a combination of a surface diffuser and at least one prismatic structure.

11. The display of claim 1, wherein the light diffusing arrangement comprises a combination of a surface diffuser and at least one trapezoidal structure.

12. The display of claim 1, wherein the light diffusing arrangement comprises a combination of a surface diffuser and at least one pyramid structure.

13. The display of claim 1, wherein the light diffusing arrangement comprises a combination of a surface diffuser and at least one truncated pyramid structure.

* * * * *